United States Patent [19]
Bosnyak et al.

[11] Patent Number: 5,767,699
[45] Date of Patent: Jun. 16, 1998

[54] FULLY COMPLEMENTARY DIFFERENTIAL OUTPUT DRIVER FOR HIGH SPEED DIGITAL COMMUNICATIONS

[75] Inventors: Robert J. Bosnyak, San Jose; Robert J. Drost, Palo Alto; David M. Murata, San Jose, all of Calif.

[73] Assignee: Sun Microsystems, Inc., Palo Alto, Calif.

[21] Appl. No.: 653,788

[22] Filed: May 28, 1996

[51] Int. Cl.⁶ .......................................... H03K 19/0185
[52] U.S. Cl. ...................... 326/86; 326/30; 326/34; 326/115; 327/543
[58] Field of Search ...................... 326/82–83, 86, 326/114–115, 30, 32–34, 121, 90; 327/541, 543, 546

[56] References Cited

U.S. PATENT DOCUMENTS

| | | | |
|---|---|---|---|
| 5,418,478 | 5/1995 | Van Brunt et al. | 326/86 |
| 5,450,026 | 9/1995 | Morano | 326/86 |
| 5,519,728 | 5/1996 | Kuo | 326/86 |
| 5,592,510 | 1/1997 | Van Brunt et al. | 326/86 |
| 5,635,859 | 6/1997 | Yokota et al. | 326/34 |

*Primary Examiner*—Jon Santamauro
*Attorney, Agent, or Firm*—Skjerven, Morrill, MacPherson, Franklin & Friel LLP; Forrest E. Gunnison

[57] ABSTRACT

A terminating element is connected between the terminating ends of a transmission line pair. A switching mechanism coupled to the originating ends of the transmission line pair steers a constant current through the transmission line pair. In response to input control signals, the switching mechanism steers the constant current in a complementary fashion into one of the lines of the transmission lines pair to creates a differential output voltage across the terminating element. Controlling the differential voltage by manipulating current flow allows for acurate control over $V_{OH}$ and $V_{OL}$ levels. Since the terminating element is connected between terminating ends of the transmission line pair, nearly all of the constant current flowing the driver contributes to the differential output voltage, thereby reducing power undesirable power dissipation. Further, the alternating current flow through the transmission line pair creates a virtual ground at the center of the terminating element and thereby allows drivers in accordance with the present invention to obtain twice the output voltage swing of conventional transmission line drivers without requiring additional current. In this manner, a further reduction in power consumption is achieved.

5 Claims, 3 Drawing Sheets

FULLY COMPLEMENTARY DIFFERENTIAL OUTPUT DRIVER FOR HIGH SPEED DIGITAL COMMUNICATIONS

BACKGROUND

1. Field of the Invention

The present invention relates generally to output drivers and specifically to output drivers for driving high speed transmission lines.

2. Description of Related Art

Output drivers for driving cables interconnecting ICs, peripheral devices, traces, and so on are well known. FIG. 1 shows an emitter-coupled logic (ECL) output driver 10 fabricated using conventional bipolar technology. NPN transistors Q1 and Q2 form a differential pair which, in response to a voltage differential $V_2-V_1$, steers a bias current $I_E$ between resistors $R_{c1}$ and $R_{c2}$, respectively, to produce a differential output voltage between nodes 12 and 14. Resistor $R_{c1}$ sets the minimum voltage at node 12 and, thus, controls the voltage swing at node 12. In a similar manner, resistor $R_{c2}$ controls the voltage swing at node 14. Accordingly, resistors $R_{c1}$ and $R_{c2}$ control the differential signal level provided across the bases of NPN emitter-follower transistors Q3 and Q4. Transistors Q3 and Q4 drive transmission lines $T_1$ and $T_2$, respectively, with a low output impedance to minimize signal attenuation. Transmission lines $T_1$ and $T_2$ have a characteristic impedance $Z_T$ of typically 50Ω or 75Ω. Terminating resistors $R_1$ and $R_2$ are connected between power supply $V_{EE}$ and transmission lines $T_1$ and $T_2$, respectively, and are typically chosen to match the characteristic impedance of lines $T_1$ and $T_2$, i.e., $R_1=R_2=Z_T$.

Driver 10 typically operates using a $V_{cc}$ power supply of approximately 5V. In that case, the emitter of each of transistors Q3 and Q4 should swing between a maximum voltage $V_{OH}$ of approximately 4V and a minimum voltage $V_{OL}$ of approximately 3V in a complementary manner depending upon the polarity of the input signal $V_2-V_1$. It is this voltage signal $V_O=V_{OH}-V_{OL}$ appearing between the respective emitters of transistors Q3 and Q4 that appears across transmission lines $T_1$ and $T_2$, where $$V_{OH}=V_{CC}-V_{be(Q3)}$$

and $$V_{OL}=V_{CC}-I_E R_C-V_{be(Q3)}.$$

A major disadvantage of driver 10 is that since the minimum emitter voltage of each of transistors Q3 and Q4 is approximately 3V, a steady state current greater than approximately $3V/R_L$ will always flow in the collectors of transistor Q3 and Q4 of driver 10. Note that this steady state current does not contribute to the output signal provided to transmission lines $T_1$ and $T_2$. The average total steady state current $I_{dis}$ flowing through load resistors $R_L$ is given by the expression $$I_{dis}=\frac{V_{OH}+V_{OL}}{R_L}$$

The current $I_{dis}$ results in a considerable amount of undesirable power dissipation in driver 10. Although it is possible to reduce such power dissipation by tying the load resistors $R_L$ to a 2.5 volt power supply, such a configuration would require an additional power supply. Further, since the voltage decay at the load resistors in an exponential fashion, raising the value of $V_{EE}$ to 2.5 volts would result in a slower falling edge.

Other conventional bipolar drivers employ only the differential pair of the above-described ECL driver 10 such that transmission line pair $T_1$, $T_2$ is directly coupled to the collectors of the differential pair transistors. This configuration, which is referred to as current mode logic (CML), also suffers from the power dissipation problem described above.

More recently, the above-mentioned ECL and CML topologies have been emulated in CMOS technology. For example, a CMOS implementation of CML techniques is described an article by Kyongho Lee et al entitled "A CMOS Serial Link For 1 Gbaud Fully Duplexed Data Communication," 1994 Symposium on VLSI Circuits Digest of Technical Papers, page 125, and a CMOS buffer emulating an ECL topology is described by Niantsu Wang in "Digital MOS Integrated Circuits," Prentice Hall (1989), page 156. Like their bipolar counterparts, these CMOS output drivers all dissipate a considerable amount of power via a steady state current which does not contribute to the output signal. Also note that due to a lack of a semiconductor junction referenced source, such CMOS drivers are typically unable to maintain precise $V_{OH}$ and $V_{OL}$ levels.

Such CMOS output drives are disadvantageous for several additional reasons. First, each drive transistor in the CMOS topology must be precisely sized to accommodate not only the output signal $V_O$ but also the DC power levels of a receiver (not shown) coupled to terminating resistors $R_1$ and $R_2$. Second, each of such drivers requires at its receiving terminal a connection to a power supply terminal. This terminal connection thus requires the two terminating resistors $R_1$ and $R_2$ plus at least three terminal nodes, thereby increasing the silicon area consumed as well as driving up the manufacturing cost of the driver. These three terminal connections may also result in undesirable parasitics.

SUMMARY

An output driver is disclosed herein which overcomes problems in the art described above. In accordance with the present invention, a terminating element is connected between the first ends of a transmission line pair. A constant current is steered in alternating directions through the transmission line pair by differential amplifiers connected between second ends of the transmission line pair and a bias circuit. In this manner, a differential voltage having accurately controlled voltage separation between the high and low levels is generated across the terminating element. Connecting the terminating element directly across the first ends of the transmission line pair eliminates the need for power supply connections, thereby saving silicon real estate. The alternating current flow through the transmission line pair, in creating a virtual ground at the center of the terminating element, allows drivers in accordance with the present invention to obtain twice the output voltage swing of conventional transmission line drivers without requiring additional current and, therefore, without increasing power consumption.

DETAILED DESCRIPTION

Figure 1:
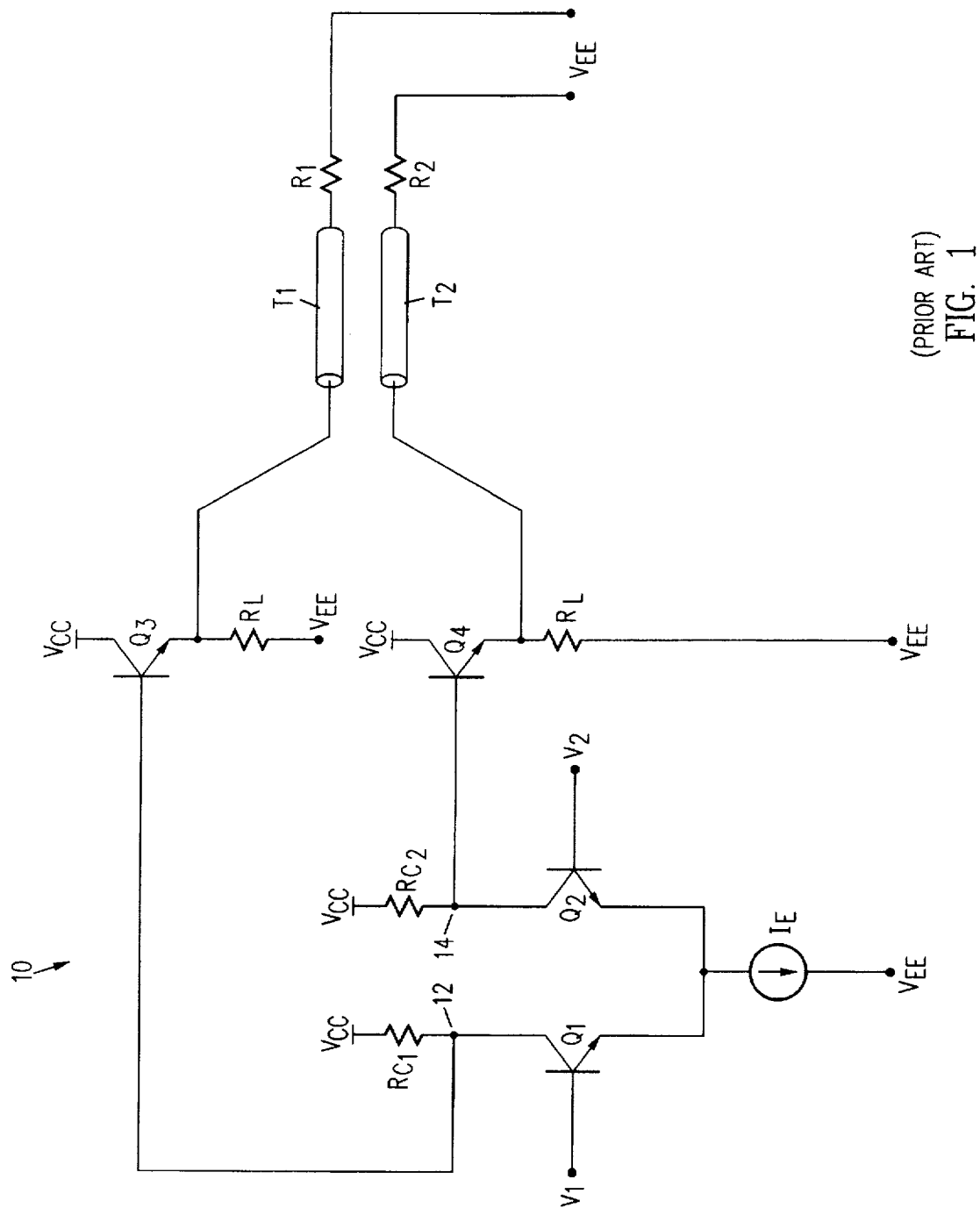
FIG. 1 is a schematic diagram of a conventional emitter-coupled logic output driver circuit.
Figure 2:
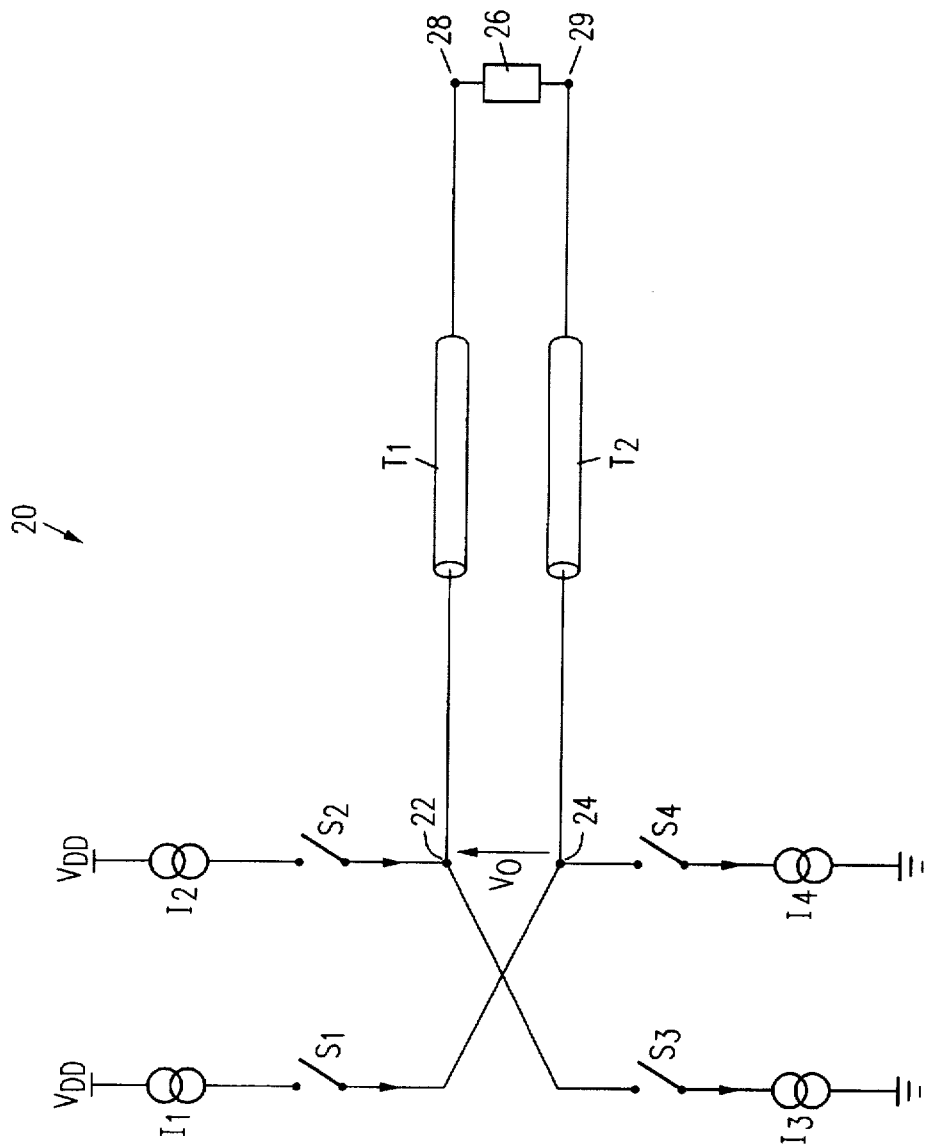
FIG. 2 is a block diagram of an output driver topology in accordance with the present invention.

Embodiments in accordance with the present invention may be implemented as a near constant current differential driver and modelled as Four Norton equivalent current sources. Referring to FIG. 2, these current sources are shown as sources $I_1$, $I_2$, $I_3$, and $I_4$, where the current through each is equal to $I_0$. Note that those elements common to the circuit of FIG. 1 and the topology of FIG. 2 are labelled with the same notations.

Current sources $I_1$ and $I_2$ are coupled between a power supply $V_{DD}$ and switches $S_1$ and $S_2$, respectively, and current sources $I_3$ and $I_4$ are coupled between ground and switches $S_3$ and $S_4$, respectively. Switches $S_2$ and $S_3$ are coupled at node 22 to a first line $T_1$ of a transmission line pair. Switches $S_1$ and $S_4$ are coupled at node 24 to a second line $T_2$ of the transmission pair. A terminating element 26 is coupled between the receiving end of transmission line $T_1$ at node 28 and the receiving end of transmission line $T_2$ at node 29. Since terminating element 26 is coupled directly between transmission lines $T_1$ and $T_2$, element 26 should have a resistance $R_0$ equal to the sum of the characteristic impedances of transmission lines $T_1$ and $T_2$, i.e. $R_0 = 2Z_T$.

Switches $S_1$ and $S_3$ switch in phase with one another and 180 degrees out of phase with each of switches $S_2$ and $S_4$ to effect an alternating current flow through the transmission line pair $T_1$ and $T_2$ and resistance 26. This alternating current flow creates an output voltage $V_0$ between nodes 22 and 24. For example, where driver 20 is coupled to receive an input logic signal A-from an attached circuit or cable (not shown), A is coupled to a control terminal of switches $S_1$ and $S_3$ and $\overline{A}$ is coupled to a control terminal of switches $S_{2\ and\ S4}$. Thus, where signal A is high, switches $S_1$ and $S_3$ conduct and switches $S_2$ and $S_4$ do not conduct. A current $I_0$ flows from $V_{DD}$ through transmission line $T_2$ and impedance 26 via switch $S_1$, then back through transmission line $T_1$ and to ground via switch $S_3$. This current flow creates voltage $V_0$ across terminating element 26, where $V_0=I_0* R_3$. Note that the polarity of $V_0$ when signal A is high is such so that node 24 is at a maximum voltage $V_{OH}$ and node 22 is at a minimum voltage $V_{OL}$, where the differential voltage $V_0=V_{OL}-V_{OL}$.

When signal A goes low, switches $S_1$ and $S_3$ turn off and switches $S_2$ and $S_4$ turn on. Now, current $I_0$ flows from $V_{DD}$ through transmission line $T_1$ via switch $S_2$ and then to ground through terminating element 26 and transmission line $T_2$ via switch $S_4$. The differential voltage between nodes 22 and 24, as given by $V_0=I_0 * R_0$, is now of an opposite polarity such that node 22 is at a maximum voltage $V_{OH}$ and node 24 is at a minimum voltage $V_{OL}$. In this manner, the voltage $V_0$ is indicative of the logic state of signal A and may be detected by a receiver circuit (not shown) at terminating element 26. Thus, output driver 20 drives output signal $V_0$ by controlling the current through transmission lines $T_1$ and $T_2$. This is in marked contrast to the operation of prior art driver 10 of FIG. 1 and conventional ECL-style CMOS drivers.

The above described Norton equivalent current sources $I_1-I_4$ are preferably implemented using any suitable CMOS current mirror implementation. In using such current mirrors, the current $I_0$ may be expressed as:

$$I_{0,sat} = \left(\frac{k_p}{2}\right)\left(\frac{W}{L}\right)(V_{gs}-V_t)^2$$

where $k_p$ is the transconductance, W is the gate width, L is the gate length, $V_{gs}$ is the gate to source voltage, and $V_T$ is the threshold voltage of the CMOS transistors (not shown) used in providing the current $I_0$. These transistors used to provide the current $I_0$ are preferably referenced to internally controlled bias circuits (not shown) and may be switched by logic signals generated within driver 20's host chip (not shown).

In the above-described embodiment the current sources $I_1-I_4$ are set equal to each other. In other embodiments each of current sources I1 and I2 provides a slightly higher current than does each of current sources I3 and I4. This configuration forces the average voltage appearing between nodes 22 and 24, e.g. $V_{0,av}$, to move towards the positive supply $V_{DD}$, thereby emulating an ECL-style output signal. Setting sources $I_3$ and $I_4$ slightly higher than sources $I_1$ and $I_2$ will, on the other hand, result in $V_{0,av}$ being pushed towards ground. In yet other embodiments, the currents through sources $I_1$, $I_2$, $I_3$, and $I_4$ are set by a reference voltage to force $V_{0,av}$ to some intermediate voltage. Adjustable current levels enable one to adjust the average DC output voltage levels of driver 20 according to the operating characteristics of a receiver circuit (not shown) coupled thereto. In this manner, driver 20 is able to achieve maximum efficiently when coupled to any of numerous different receiver circuits.

Figure 3:
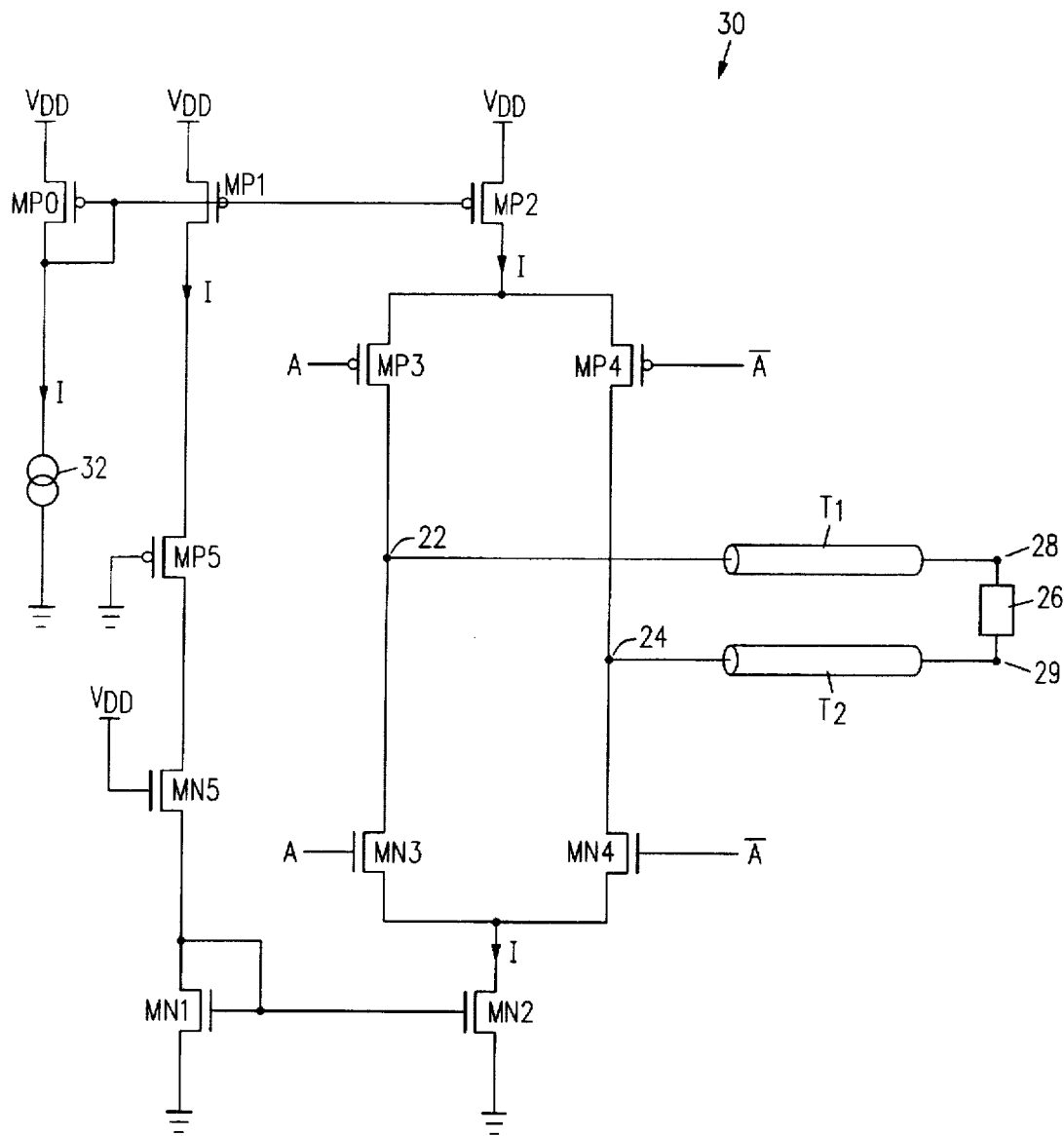
FIG. 3 is a schematic diagram of one embodiment in accordance with the topology of FIG. 2.

FIG. 3 shows an output driver 30 in accordance with the topology of FIG. 2 which employs CMOS transistor pairs MP3, MP4 and MN3, MN4 in differential amplifier configurations. Transistors MN1, MN2, MN5, MP0, MP1, MP2, and MP5, which are preferably CMOS transistors, and a current source 32 connected between ground potential and transistor MP0 form a bias circuit which sources a bias current I to differential pair MP3, MP4 and sinks current I from differential pair MN3, MN4. Transistors MN1 and MN2 are of equal size, transistor MN3, MN4, and MN5 are equal in size, transistors MP3, MP4, and MP5 are equal in size, and transistors MP0, MP1, and MP2 are equal in size. In this manner, transistors MP1 and MP2 mirror equal current I and thereby source equal current to transistor MP5 and to differential pair MP3, MP4, respectively. In a similar manner, transistors MN1 and MN2 sinks an equal current I from the source of transistor MN5 and from the common sources of transistors MN3 and MN4, respectively. Note that transistors MP5 and MN5 are matched to differential pairs MP3, MP4 and MN3, MN4, respectively, to ensure that the current I sourced to differential pair MP3, MP4 is equal to the current sinked from differential pair MN3, MN4. Transistors MP3 and MP4 steer, in response to input signals A and $\overline{A}$ provided to the respective gates thereof, a differential current I±ΔI through transmission line pair $T_1$ and $T_2$. In a similar manner, transistors MN3 and MN4 operate as a current steering mechanism in response to input signals A and $\overline{A}$ provided at the respective control gates thereof. Thus, transistor pairs MN3, MN4 and MP3, MP4 operate in a manner similar to that of switches $S_1-S_4$ of driver 20 (FIG. 2) to steer current I in alternate directions through terminating element 26, thereby producing a output differential voltage indicative of the input signal A. Note that although the embodiment shown in FIG. 3 employs CMOS transistors as switches, it is to be understood that any suitable switching devices may be so employed therein.

When signal A is low (and $\overline{A}$ is thus high), transistors MN4 and MP3 are turned on and transistors MN3 and MP4 are turned off. The current I sourced by transistor MP2 is steered entirely through transmission line $T_1$ via node 22, through terminating element 26, and then back through transmission line $T_2$ to ground via transistors MN4 and MN2. This direction of current flow through driver 30 results in output differential voltage $V_O$ appearing between nodes 22 and 24 having a polarity such that node 22 is at the maximum voltage $V_{OH}$ and node 24 is at the minimum voltage $V_{OL}$. When signal A transitions high (and $\overline{A}$ is thus low), the current flow I in driver 30 is reversed which, as described above, reverses the polarity of the output differential voltage $V_O$ such that node 22 approaches $V_{OL}$ and node 24 approaches $V_{OH}$.

Note that the scaling between transistors MN2, MP2 and transistors MN1, MP1 may be altered to vary the amount of current sourced to transmission lines $T_1$, $T_2$ through transistor MP2. In other words, transistors MN2 and MP2 may be fabricated so as to have an effective area m times that of respective transistors MN1 and MP1 so that a current $I=m*I_0$ flows through terminating element 26.

The operation of output drivers in accordance with the present invention results in numerous advantages over conventional output drivers. As mentioned above, the present topology controls the output voltage levels $V_{OH}$ and $V_{OL}$ by delivering a constant current of alternating polarity to effect a differential voltage across nodes 22 and 24, as opposed to switching voltage levels. Having such precise control over the current levels allows drivers 20 and 30 to maintain precise VON and $V_{OL}$ levels over temperature and process variations.

Note that all of the current I switched within driver 30 flows through terminating element 26 at the end of the transmission line pair $T_1$, $T_2$, irrespective of the binary state of an input signal, e.g. signal A, provided to driver 30. Thus, power supply connections are not required at the input of a receiver circuit (not shown) coupled to driver 30, i.e., it is not necessary to couple the ends of transmission lines $T_1$ and $T_2$ of driver 30 to $V_{DD}$ via matched terminating impedances, as is required for instance by conventional driver 10 (see resistors $R_1$ and $R_2$ of FIG. 1). Elimination of such power supply connections results in a savings in silicon area and fabrication costs and also helps to minimize undesirable parasitics.

The alternating current flow I through transmission lines $T_1$ and $T_2$ creates a virtual ground at the "center" of terminating element 26. This complementary nature of the current flow $I_0$ in driver 30 flowing through terminating element 26 allows driver 30 to obtain the same output voltage swing $V_{OH}-V_{OL}$ as that of conventional driver 10 while using only half the current. For example, assuming a characteristic impedance $Z_T=50$ ohms, conventional driver 10 requires a 4 mA current to produce an output voltage swing equal to 200 mV $V_O=4$ mA * $R_1 4Z_T$) while driver 30 requires only a 2 mA current ($V_O=2$ mA * $R_O=2$ mA * $2Z_T=4Z_T$) to produce a 200 mV $V_O$ swing. In this manner, driver 30 is able to cut power consumption in half without any degradation in performance. Further, this reduction in power allows for the scaling down of transistors used in the fabrication of driver 30 and, thus, results in even greater savings in silicon area.

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of this invention.

We claim:

1. An output driver for driving a pair of transmission lines having a terminating element connected between respective receiving ends of said pair of transmission lines, said driver comprising:
    a bias circuit having:
        first and second terminals;
        a current source;
        a first current mirror coupled between said current source and said first terminal; and
        a second current mirror coupled between said first current mirror and said second terminal;
    a first differential amplifier connected between said first terminal of said bias circuit and respective first ends of said pair of transmission lines; and
    a second differential amplifier connected between said second terminal of said bias circuit and respective first ends of said pair of transmission lines.

2. The driver of claim 1 wherein said first differential amplifier comprises:
    a first transistor having a first terminal coupled to said first end of a first one of said pair of transmission lines, a second terminal coupled to said first terminal of said bias current circuit, and a control terminal coupled to a first control node; and
    a second transistor having a first terminal coupled to said first end of a second one of said pair of transmission lines, a second terminal coupled to said first terminal of said bias current circuit, and a control terminal coupled to a second control node.

3. The driver of claim 2, wherein said second differential amplifier comprises:
    a third transistor having a first terminal coupled to said first end of said first one of said pair of transmission lines, a second terminal coupled to said second terminal of said bias current circuit, and a control terminal coupled to said second control node; and
    a fourth transistor having a first terminal coupled to said first end of said second one of said pair of transmission lines, a second terminal coupled to said second terminal of said bias current circuit, and a control terminal coupled to said first control node.

4. The driver of claim 3, further comprising:
    a fifth transistor having a first terminal coupled to said first current mirror, a control terminal, and a second terminal; and
    a sixth transistor having a first terminal coupled to said second terminal of said fifth transistor, a control terminal, and a -second terminal coupled to said second current mirror.

5. The driver of claim 4, wherein said first, second, and fifth transistors are matched in size to one another, and said third, fourth, and sixth transistors are matched in size to one another.

* * * * *